United States Patent
Joshi et al.

(10) Patent No.: US 8,178,587 B2
(45) Date of Patent: May 15, 2012

(54) METHOD FOR RECOVERING A NATURAL GAS CONTAMINATED WITH HIGH LEVELS OF $CO_2$

(75) Inventors: Mahendra Ladharam Joshi, Katy, TX (US); Jingyu Cui, Katy, TX (US); Frederik Arnold Buehrman, Katy, TX (US); Scott Lee Wellington, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 332 days.

(21) Appl. No.: 12/465,256

(22) Filed: May 13, 2009

(65) Prior Publication Data

US 2009/0286890 A1 Nov. 19, 2009

Related U.S. Application Data (60) Provisional application No. 61/053,233, filed on May 15, 2008.

(51) Int. Cl.
*C07C 27/00* (2006.01)

(52) U.S. Cl. .......... 518/703; 518/700; 518/72; 518/704; 518/705

(58) Field of Classification Search ........... 518/700–705
See application file for complete search history.

(56) References Cited

U.S. PATENT DOCUMENTS

| | | | | |
|---|---|---|---|---|
| 4,098,339 | A | 7/1978 | Weisz et al. | 166/305 |
| 5,628,931 | A | 5/1997 | Lednor et al. | 252/373 |
| 6,152,987 | A | 11/2000 | Ma et al. | 55/524 |
| 6,702,960 | B1 | 3/2004 | Schaddenhorst et al. | 502/327 |
| 6,736,955 | B2 | 5/2004 | Shaw | 205/450 |
| 6,846,404 | B2 | 1/2005 | O'Rear | 208/133 |
| 2003/0007926 | A1 * | 1/2003 | Jiang et al. | 423/651 |

FOREIGN PATENT DOCUMENTS

WO  WO0000426  1/2000

OTHER PUBLICATIONS

Song, Tri-reforming, (Applied Catalysis in Energy Laboratory pp. 772-776, 1999).*
Song-Bai Tang, "Combined Partial Oxidation and Carbon Dioxide Reforming of Methane Process to Synthesis Gas," *Journal of Natural Gas Chemistry*, vol. 5, No. 3, 1996, pp. 272-277, XP002536173.
Nor Aishah Saidina Amin et al., "Thermodynamic Equilibrium Analysis of Combined Carbon Dioxide Reforming With Partial Oxidation of Methane to Syngas," *International Journal of Hydrogen Energy*, Elsevier Science Publishers B.V., Barking, GB vol. 32, No. 12, (2007) pp. 1789-1798, XP022201200.
Mark E. Dry, "The Fischer-Tropsch Process: 1950-2000," *Catalysis Today*, vol. 71, No. 3-4, Jan. 15, 2002, pp. 227-271, XP002536174.
Eckhard Fiedler et al. "Methanol," *Ullmann's Encyclopedia of Industrial Chemistry*, Jun. 15, 2000 XP002536175, Section "5.2 Synthesis" Retrieved from the Internet: URL:http://mrw.interscience.wiley.com/emrw/9783527306732/ueic/articie/a16_465/current/pdf>.
A. T. Ashcroft et al., "Partial Oxidation of Methane to Synthesis Gas Using Carbon Dioxide," *Nature*, vol. 352, Jul. 18, 1991, pp. 225-226, XP002536172.
Stefan Rabe et al., "Low Temperature Catalytic Partial Oxidation of Methane for Gas-to-Liquids Applications," *Applied Catalysis A*: General 292 (2005) pp. 177-188.
Stefan Rabe et al. "Low Temperature Catalytic Partial Oxidation of Methane for Gas-to-Liquids Applications", Jul. 27, 2005, pp. 177-188, Applied Catalysis A: General 292.

* cited by examiner

*Primary Examiner* — Jafar Parsa (57) ABSTRACT

The present invention provides a method for recovering a natural gas contaminated with high levels of carbon dioxide. A gas containing methane and carbon dioxide is extracted from a reservoir containing natural gas, where carbon dioxide comprises at least 50 vol. % of the extracted gas. The extracted gas is oxidized with an oxygen containing gas in the presence of a partial oxidation catalyst at a temperature of less than 600° C. to produce an oxidation product gas containing hydrogen, carbon monoxide, and carbon dioxide. The oxidation product gas is then utilized to produce a liquid hydrocarbon or a liquid hydrocarbon oxygenate.

33 Claims, 1 Drawing Sheet

METHOD FOR RECOVERING A NATURAL GAS CONTAMINATED WITH HIGH LEVELS OF $CO_2$

CROSS REFERENCE TO RELATED APPLICATIONS

This application claims priority from U.S. Provisional Application Ser. No. 61/053,233 filed May 15, 2008, which is hereby incorporated by reference in its entirety.

FIELD OF THE INVENTION

The present invention is directed to a method for recovering a natural gas contaminated with high levels of $CO_2$.

BACKGROUND OF THE INVENTION

Natural gas is a fuel gas used extensively in the petrochemical and other chemicals businesses. Natural gas is comprised of light hydrocarbons-primarily methane, with smaller amounts of other heavier hydrocarbon gases such as ethane, propane, and butane. Natural gas may also contain some quantities of non-hydrocarbon "contaminant" components such as carbon dioxide and hydrogen sulfide.

Natural gas is often extracted from natural gas fields that are remote or located off-shore. Conversion of natural gas to a liquid hydrocarbon is often required to produce an economically viable product when the natural gas field from which the natural gas is produced is remotely located with no access to a gas pipeline. One method commonly used to convert natural gas to a liquid hydrocarbon is to cryogenically cool the natural gas to condense the hydrocarbons into a liquid. Another method that may be used to convert natural gas to a liquid hydrocarbon is to convert the natural gas to a synthesis gas by partial oxidation or steam reforming, and subsequently converting the synthesis gas to a liquid hydrocarbon, such as that produced by a Fisher-Tropsch reaction. Synthesis gas prepared from natural gas may also be converted to a liquid hydrocarbon oxygenate such as methanol.

Non-hydrocarbon components of natural gas are generally considered contaminants when converting the natural gas to a liquid hydrocarbon or a liquid hydrocarbon oxygenate. Carbon dioxide is one such non-hydrocarbon contaminant, particularly when present in the natural gas in large quantities.

In a cryogenic cooling process to liquefy hydrocarbons in a natural gas, carbon dioxide may crystallize when cryogenically cooling the natural gas, blocking valves and pipes used in the cooling process. Further, carbon dioxide utilizes volume in a cryogenically cooled liquid hydrocarbon/carbon dioxide mixture that would preferably be utilized only by the liquid hydrocarbon, particularly when the liquid hydrocarbon is to be transported from a remote location.

Carbon dioxide also may impair conversion of natural gas to synthesis gas so that a liquid hydrocarbon or a liquid hydrocarbon oxygenate cannot be prepared by converting the natural gas to a synthesis gas and subsequently converting the synthesis gas to a liquid hydrocarbon or liquid hydrocarbon oxygenate. Significant quantities of carbon dioxide may impair conversion of a natural gas to synthesis gas by either partial oxidation or by steam reforming.

Partial oxidation of the natural gas to produce synthesis gas is usually effected by combustion of the natural gas with an oxygen containing gas at high temperatures-typically at least 700° C. when the partial oxidation is catalytically induced and at least 900° C. when the partial oxidation is effected with no catalyst. If a significant amount of carbon dioxide is present in the natural gas, the carbon dioxide tends to quench the combustion, limiting the effectiveness of the partial oxidation reaction to produce synthesis gas from the natural gas. Additionally, further processing a hot synthesis gas product produced by partial oxidation involves significant heat transfer and loss of thermal energy since the synthesis gas produced by partial oxidation must be cooled by at least 400° C., typically at least 500° C. to 700° C., prior to its utilization to produce a liquid hydrocarbon or a liquid hydrocarbon oxygenate, and much thermal energy is lost in such heat transfers. Thermal energy loss from partial oxidation of a natural gas containing large quantities of carbon dioxide at temperatures exceeding 700° C. is particularly excessive since the large volume of carbon dioxide present in the natural gas must be extensively cooled after partial oxidation as well as the synthesis gas product.

Highly active partial oxidation catalysts, e.g. those disclosed in Applied Catalysis A: General, Volume 292, 18 Sep. 2005, pp. 177-188 consisting of rhodium or ruthenium on a carrier, may be used to effect a catalytic partial oxidation of methane or natural gas at lower temperatures, for example, from 350° C. to 700° C. Catalytic partial oxidation at these lower temperatures with these catalysts is disclosed to generate carbon dioxide as a product, which is undesirable when the starting feed material is already highly contaminated with carbon dioxide. Further, auto-ignition of a hydrocarboneous feed and an oxygen containing gas would be expected to be quenched by high levels of carbon dioxide at such low temperatures.

Steam reforming natural gas to produce synthesis gas is an endothermic process, unlike partial oxidation, and requires input of heat to drive the reaction. If a significant amount of carbon dioxide is present in the natural gas, the heat duty required to produce the synthesis gas is large since heat must be supplied to heat the carbon dioxide as well as the methane and steam reactants. Further, the carbon dioxide acts as a diluent, reducing the rate of the steam reforming reaction by reducing the interaction of the methane and water molecules. Steam reforming, like partial oxidation, involves significant heat transfer and loss of thermal energy to reduce the temperature of the synthesis gas product prior to its utilization to produce a liquid hydrocarbon or a liquid hydrocarbon oxygenate due to the high temperatures at which steam reforming must be effected-typically from 700° C. to 1000° C.

As a result of the difficulty of processing natural gas contaminated with carbon dioxide, carbon dioxide present in a carbon dioxide contaminated natural gas is generally separated from the hydrocarbon components of the natural gas prior to processing the natural gas to a liquid. Separation techniques include scrubbing the natural gas with a liquid chemical, e.g. an amine, to remove carbon dioxide, passing the natural gas through molecular sieves selective to separate carbon dioxide from the natural gas, and passing the natural gas through a membrane selective to separate carbon dioxide from the natural gas. These methods of separating carbon dioxide from a natural gas are effective for natural gases containing 40 vol. % or less of carbon dioxide, more typically 20 vol. % or less, but are either ineffective or commercially prohibitive in energy costs to separate carbon dioxide from natural gas when the natural gas is contaminated with at least 50 vol. % of carbon dioxide.

Production of natural gas from natural gas fields containing natural gas contaminated with at least 50 vol. % carbon dioxide is generally not undertaken due to the difficulty of producing liquid hydrocarbons or liquid hydrocarbon oxygenates from natural gas contaminated with such large quantities of carbon dioxide and the difficulty of removing carbon dioxide from the natural gas when present in such a large quantity. However, some of the largest natural gas fields discovered to date are contaminated with high levels of carbon dioxide. Therefore, there is a need for an energy efficient, effective method to produce liquid hydrocarbons or liquid hydrocarbon oxygenates from a natural gas highly contaminated with carbon dioxide.

U.S. Pat. No. 6,702,960 provides a process for the catalytic partial oxidation of a hydrocarbonaceous feedstock to produce a synthesis gas. The hydrocarbonaceous feedstock may be methane, natural gas, or other sources of light hydrocarbons, and optionally may contain up to 60 vol. % carbon dioxide, especially 0.1-40 vol. % carbon dioxide. Although the process provides that a hydrocarbonaceous feed containing greater than 50 vol. % carbon dioxide (e.g. up to 60 vol. %), may be partially oxidized the partial oxidation is effected at a temperature of from 750° C. to 1400° C., which, as described above, is inefficient energetically due to loss of thermal energy in heat transfers, requires large heat exchangers formed of materials specifically constructed to withstand very high temperatures, and is subject to inefficient operation due to high levels of carbon dioxide quenching the combustion.

Improved processes are desirable for processing a natural gas contaminated with greater than 50 vol. % carbon dioxide to enable production of liquid hydrocarbons or liquid hydrocarbon oxygenates from natural gas fields containing high levels of carbon dioxide. In particular, more energy efficient processes that are effective for converting a natural gas contaminated with at least 50 vol. % carbon dioxide to a synthesis gas and subsequently to a liquid hydrocarbon or a liquid hydrocarbon oxygenate are desirable.

SUMMARY OF THE INVENTION

The present invention is directed to a process for recovering a natural gas contaminated with high levels of $CO_2$ and converting the natural gas into a liquid hydrocarbon containing one or more hydrocarbons or a liquid hydrocarbon oxygenate containing one or more liquid hydrocarbon oxygenates, comprising:

a) extracting a gas comprising carbon dioxide and methane from a reservoir containing natural gas, where carbon dioxide comprises at least 50 vol. % of the extracted gas; and b) oxidizing the extracted gas with an oxygen containing gas in the presence of a partial oxidation catalyst at a temperature of less than 600° C. to produce an oxidation product gas containing hydrogen, carbon monoxide, and carbon dioxide, where the molar ratio of oxygen from the oxygen containing gas to carbon from the hydrocarbons of the extracted gas is less than one;

c) utilizing the oxidation product gas to produce the liquid hydrocarbon containing one or more hydrocarbons or the liquid hydrocarbon oxygenate containing one or more hydrocarbon oxygenates.

In an embodiment, the oxidation product gas is utilized to produce a liquid hydrocarbon oxygenate by:

a) optionally contacting the oxidation product gas with steam and a water-gas shift catalyst at a temperature of from 200° C. to 400° C. and a pressure of from 0.1 MPa to 15 MPa to produce a water-gas shifted oxidation product gas; and b) contacting the oxidation product gas or the water-gas shifted oxidation product gas with a hydrocarbon oxygenate synthesis catalyst at a temperature of from 200° C. to 300° C. and a pressure of from 5 MPa to 15 MPa to produce a hydrocarbon oxygenate product gas containing a hydrocarbon oxygenate;

c) optionally separating one or more non-hydrocarbon oxygenate gases from the hydrocarbon oxygenate product gas to produce a hydrocarbon oxygenate-enriched hydrocarbon oxygenate product gas; and d) separating liquid hydrocarbon oxygenate from the hydrocarbon oxygenate product gas or the hydrocarbon oxygenate-enriched hydrocarbon oxygenate product gas. In an embodiment the hydrocarbon oxygenate is methanol.

In another embodiment, the oxidation product gas is utilized to produce a liquid hydrocarbon by:

a) optionally contacting the oxidation product gas with steam and a water-gas shift catalyst at a temperature of from 200° C. to 400° C. and a pressure of from 0.1 MPa to 15 MPa to produce a water-gas shifted oxidation product gas;

b) contacting the oxidation product gas or the water-gas shifted oxidation product gas with a Fisher-Tropsch catalyst at a temperature of from 200° C. to 400° C. and a pressure of from 1 MPa to 5 MPa to produce a hydrocarbon product gas;

c) optionally separating one or more non-hydrocarbon gases from the hydrocarbon product gas to produce a hydrocarbon-enriched hydrocarbon product gas; and d) separating liquid hydrocarbons from the hydrocarbon product gas or the hydrocarbon-enriched hydrocarbon product gas.

DETAILED DESCRIPTION OF THE INVENTION

The present invention provides a process for recovering a natural gas from a natural gas field contaminated with at least 50 vol. % $CO_2$ and converting the recovered natural gas into a liquid hydrocarbon containing one or more liquid hydrocarbons or a liquid hydrocarbon oxygenate containing one or more liquid hydrocarbon oxygenates. According to the process of the invention, natural gas contaminated with at least 50 vol. % $CO_2$ is extracted from a natural gas field and is converted to an oxidation product gas including synthesis gas by catalytic partial oxidation without separating the $CO_2$ from the natural gas. The catalytic partial oxidation is effected at a temperature of less than 600° C. utilizing a catalyst having an activity sufficient to catalyze the partial oxidation of hydrocarbons in the natural gas at such temperatures. The high levels of $CO_2$ present in the contaminated natural gas act as an oxidation reaction regulator to help maintain the temperature of the exothermic catalytic partial oxidation reaction below 600° C. The resulting oxidation product gas, including the $CO_2$ and synthesis gas, is then utilized to produce a liquid hydrocarbon product or a liquid hydrocarbon oxygenate product. In an embodiment, the resulting oxidation product gas is utilized to produce methanol, where the $CO_2$ present in the oxidation product gas participates in the methanol synthesis reaction to increase the rate of conversion of carbon monoxide and hydrogen to methanol. In another embodiment, the resulting oxidation product gas is utilized to produce liquid hydrocarbons in a Fisher-Tropsch synthesis reaction. The $CO_2$ is easily separated from the liquid hydrocarbon product or liquid hydrocarbon oxygenate product by condensing the liquid hydrocarbon product or liquid hydrocarbon oxygenate product and separating the condensate from the $CO_2$ containing gas.

The process of the present invention enables efficient production of liquid hydrocarbon products or liquid hydrocarbon oxygenate products from natural gas contaminated with high levels of $CO_2$ relative to conventional methods for processing natural gas to liquid hydrocarbons or liquid hydrocarbon oxygenates. In one aspect, the process of the present invention is much more efficient than such conventional processes in that the process of the present invention does not generate large amounts of thermal energy in the production of a synthesis gas that may be lost in inefficient heat exchange processes. In the process of the present invention, synthesis gas is produced as part of an oxidation product gas from a low temperature catalytic partial oxidation reaction conducted at less than 600° C.—in part because the high levels of $CO_2$ contaminating the natural gas are utilized to maintain the temperature of the partial oxidation reaction below 600° C. A relatively small amount of heat must be removed from the oxidation product gas containing the synthesis gas prior to reacting the oxidation product gas to produce a liquid hydrocarbon product or a liquid hydrocarbon oxygenate product-typically at most 300° C. As a result, little thermal energy is lost in heat exchange processes relative to conventional methods for processing natural gas into liquid hydrocarbons or liquid hydrocarbon oxygenates.

The relative energy efficiency of the process of the present invention permits the recovery of natural gas from natural gas fields contaminated with 50 vol. % or more $CO_2$. No energy is required to separate $CO_2$ from the natural gas prior to forming a synthesis gas from the natural gas, and the thermal energy efficiency of the process limits energy losses sufficiently to make recovery of the $CO_2$ contaminated natural gas commercially feasible.

The relative energy efficiency of the process of the present invention also renders recovery of natural gas from natural gas fields contaminated with at least 50 vol. % $CO_2$ practical from an equipment and materials standpoint. Reactors and equipment may be utilized that are formed of standard materials capable of withstanding temperatures of up to 600° C. instead of specialized materials designed to withstand very high temperature catalytic partial oxidation reactions, partial oxidation reactions, or steam reforming reactions. Smaller heat exchange equipment may also be utilized relative to heat exchange equipment required for very high temperature processes, which is important when the process is implemented in a remote location or offshore.

As used herein, when two or more elements are described as "operatively connected" or "operatively coupled", the elements are defined to be directly or indirectly connected. In the context of elements defining a flow path for a gas or a liquid, the term operatively connected or operatively coupled indicates that the designated elements are connected directly or indirectly to permit fluid or gas flow between the elements. In the context of elements for generating and/or consuming electricity, the term operatively connected or operatively coupled indicates that the designated elements are electrically connected either directly or indirectly.

As used herein, the term "natural gas" is defined as a gas containing one or more hydrocarbons that may contain additional non-hydrocarbon components including carbon dioxide, carbon monoxide, nitrogen, and hydrogen sulfide.

Figure 1:
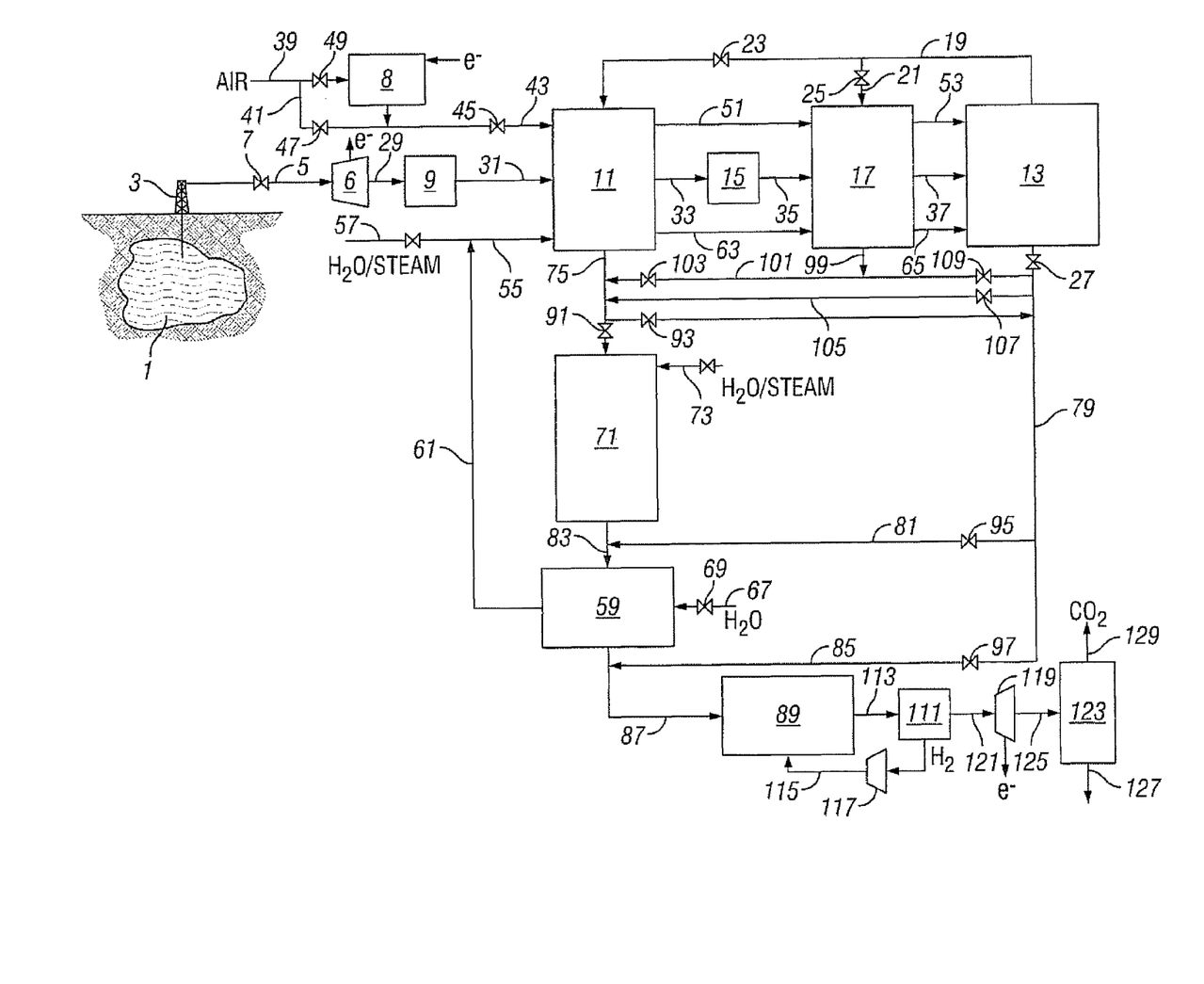
FIG. 1 is a schematic of a system that may be used to practice the process of the present invention.

Referring now to FIG. 1, which shows a system useful for practicing a process of the present invention, a process in accordance with the present invention will be described. Initially, a natural gas comprising methane and carbon dioxide is extracted from a natural gas reservoir 1, where the extracted gas contains at least 50 vol. % carbon dioxide. The natural gas reservoir 1 may contain a natural gas comprising methane and carbon dioxide, where the carbon dioxide comprises at least 50 vol. % of gas in the natural gas reservoir 1, or may contain a natural gas comprising methane and carbon dioxide where the carbon dioxide comprises less than 50 vol. % of the natural gas in the reservoir 1, but where the gas extracted from the reservoir 1 comprises at least 50 vol. % carbon dioxide. The gas extracted from the natural gas reservoir 1 may be extracted according to conventional methods for extracting a gas from a natural gas reservoir. In an embodiment, the gas may be extracted from the natural gas reservoir 1 by drilling a natural gas well 3 into the natural gas reservoir 1 and extracting the gas from the natural gas reservoir 1 through the well 3.

Conventional methods for assisting extraction of a gas from a natural gas reservoir may be utilized to aid in extraction of the gas from the reservoir 1, for example, acidizing and fracturing may be used to aid in extraction of the gas from the reservoir 1. The reservoir 1 may be acidized by injecting an acid, typically hydrochloric acid, into the reservoir through the well 3 to dissolve portions of rock in the reservoir 1 to increase flow of gas into and through the well 3. The reservoir 1 may be fractured to open the reservoir formation for increased gas flow by injecting a high pressure fluid or gas through the well 3 into the reservoir 1. The high pressure fluid or gas utilized for fracturing may be water or, in a preferred embodiment, carbon dioxide, where the carbon dioxide is provided from a by-product stream of the process of the present invention, as described below.

The gas extracted from the natural gas reservoir will contain methane and carbon dioxide, where the carbon dioxide comprises at least 50 vol. % of the extracted gas. In an embodiment, the carbon dioxide may comprise at least 55 vol. %, or more than 60 vol. %, or at least 65 vol. %, or at least 70 vol. %, or at least 75 vol. %, or at least 80 vol. % of the extracted gas. The extracted gas may also contain other compounds, for example, the extracted gas may contain low molecular weight hydrocarbon gases other than methane such as ethane, propane, and butane, and may also contain gaseous sulfur containing compounds, for example, hydrogen sulfide.

The extracted gas forms a feedstock for a process for converting hydrocarbons, particularly methane, in the extracted gas to one or more liquid hydrocarbons and/or one or more liquid hydrocarbon oxygenates. The process includes the steps of catalytically partially oxidizing the extracted gas to form an oxidation product gas containing synthesis gas, and subsequently, utilizing the oxidation product gas, or a derivative thereof, as a feedstock for producing a hydrocarbon oxygenate or a hydrocarbon and subsequently condensing the hydrocarbon oxygenate or hydrocarbon to a liquid.

After extraction, the extracted gas is delivered to processing equipment effective to conduct the process of the invention. In an embodiment, line 5 and valve 7 may be used to control the flow of the extracted gas from the well 3 into the process.

The extracted gas may be conditioned prior to being catalytically partially oxidized. The extracted gas may be conditioned for catalytic partial oxidation by one or more steps including 1) depressurizing; 2) treating the extracted gas to remove sulfur from the extracted gas; and/or 3) heating the extracted gas. The one or more steps may be coordinated to provide optimal conditioning of the extracted gas for catalytic partial oxidation, for example, the extracted gas may be desulfurized in one or more steps in coordination with one or more heating steps.

The extracted gas will typically be at a relatively high pressure since natural gas extracted from a natural gas reservoir is generally a relatively high pressure gas. In an embodiment, the extracted gas may have a pressure of from 1 MPa to 30 MPa. In an embodiment, the extracted gas may have a pressure of from 5 MPa to 15 MPa which is within a preferred pressure range in which most of the steps of the process of the present invention are conducted, so that the pressure of the extracted gas need not be adjusted prior to feeding the extracted gas as a feedstock for catalytic partial oxidation.

In an embodiment, the extracted gas may be at very high pressure when extracted from the reservoir 1, for example, a pressure at or above 20 MPa, or at or above 15 MPa. The pressure of a very high pressure extracted gas may be reduced to a pressure more suitable for treatment in the process of the invention by expanding the very high pressure extracted gas to a selected pressure prior to catalytically partially oxidizing the extracted gas. In an embodiment, an extracted gas having a pressure above 15 MPa may be expanded to a pressure of from 1 MPa to 15 MPa, or to a pressure of from 5 MPa to 15 MPa, or to a pressure of 10 MPa.

A very high pressure extracted gas may be expanded by feeding the very high pressure extracted gas from line 5 through an expander 6, where the extracted gas may undergo a limited expansion to a pressure suitable for treatment of the extracted gas in the present process as described above. Energy may be produced by the limited expansion of a high pressure extracted gas through the expander 6, and the energy may be utilized to drive a unit 8 for separating oxygen from air, or, alternatively, may be captured as electricity.

In an embodiment, when the extracted gas has a pressure within from 1 MPa to 15 MPa upon extraction from the reservoir 1, no expansion of the extracted gas may be needed to reduce the pressure of the extracted gas in the process of the invention, and, therefore, the extracted gas need not be fed through an expander. In an embodiment, the expander 6 may optionally be excluded from the system for practicing the process of the invention.

In another embodiment, the extracted gas may have a significantly variable pressure, where the pressure of the extracted gas may range from a very high pressure, e.g. above 15 MPa, to a pressure below a very high pressure, e.g. from 1 MPa to 15 MPa. For example, the extracted gas may have a very high pressure when the gas is initially extracted from the reservoir 1 but the pressure of the gas extracted from the reservoir 1 may fall significantly over time as the reservoir 1 becomes depleted of gas. In this embodiment, the extracted gas may be expanded to a selected pressure when the pressure of the extracted gas is very high and expansion of the extracted gas may be avoided when the extracted gas has a pressure below a very high pressure. In this embodiment, the extracted gas may be fed through an expander 6 when the pressure of the extracted gas is very high, however, the extracted gas may be shunted around the expander 6 to avoid expansion of the extracted gas when the pressure of the extracted gas is below a very high pressure.

In an embodiment of the process of the present invention, the extracted gas may be desulfurized to inhibit sulfur-induced deactivation of the catalyst utilized to catalyze partial oxidation of the extracted gas. The extracted gas may be desulfurized in one or more separate steps prior to catalytic partial oxidation of the extracted gas, depending on the level of sulfur in extracted gas.

In an embodiment, the extracted gas may contain high levels, e.g. greater than 1 vol. %, of sulfur containing gas compounds such as hydrogen sulfide. In the process of the invention, the extracted gas containing high levels of sulfur containing gas compounds may be treated to reduce or eliminate such sulfur containing compounds from the extracted gas prior to catalytically partially oxidizing the extracted gas. An extracted gas containing at least 1 vol. % of sulfur containing gas compounds may be treated to reduce or eliminate such sulfur containing compounds by scrubbing the extracted gas with a sulfur scrubbing solution in a scrubber 9.

In an embodiment, the sulfur scrubbing solution is an amine, and the scrubber 9 is an amine scrubber 9. The extracted gas may be passed through the amine scrubber 9 to contact a liquid containing an amine effective to reduce or eliminate sulfur containing gas compounds in the extracted gas. Liquids containing amines effective to reduce sulfur containing gas compounds from the extracted gas may be selected from the group consisting of monoethanolamine, methyldiethanolamine, diethanolamine, and mixtures thereof.

Passing the extracted gas through an amine scrubber 9 may decrease the carbon dioxide content of the extracted gas to an extent, however, due to the large quantity of carbon dioxide in the extracted gas, elimination or removal of a substantial majority of the carbon dioxide content of the extracted gas, e.g. at least 55 vol. %, or at least 60 vol. %, or at least 70 vol. %, or at least 80 vol. %, may not be possible. Furthermore, in the process of the present invention, reduction of the carbon dioxide content of the extracted gas is unnecessary, and extensive reduction of the carbon dioxide content of the extracted gas may be undesirable. In an embodiment, a liquid containing an amine may be selected to preferentially reduce or eliminate sulfur containing compounds from the extracted gas without significantly affecting the carbon dioxide content of the extracted gas. For example, methyldiethanolamine may have a higher affinity for sulfur containing gases in the extracted gas than for carbon dioxide.

In another embodiment, the extracted gas may contain low levels, e.g. at most 1 vol. %, of sulfur containing gas compounds. In this embodiment, the extracted gas need not be passed through a scrubber 9 to reduce sulfur containing compounds, and a scrubber 9 is preferably not utilized in the process to avoid extra process steps and the utilization of extra processing equipment and treatment. In an embodiment, when the extracted gas contains at most 1 vol. % of sulfur containing compounds, the scrubber 9 may optionally be excluded from the system for practicing the process of the invention. In another embodiment when the extracted gas contains at most 1 vol. % of sulfur containing compounds, a scrubber 9 may be present in the system, but in the process the extracted gas may be shunted around the scrubber 9.

In the process of the present invention, the extracted gas may also be desulfurized in a desulfurizer 15 by contact with a solid sulfur adsorbing material, preferably disposed in a guard bed in the desulfurizer. In the process, the extracted gas is preferably desulfurized by contact with a guard bed of sulfur adsorbing material when the extracted gas contains low levels of sulfur containing compounds, e.g. at most 1 vol. %, and more preferably at most 0.1 vol. %, of sulfur containing compounds. In an embodiment of the process of the invention, the extracted gas contains at most 1 vol. % of sulfur containing compounds, and the only desulfurization step used in the process is contact of the extracted gas with a guard bed of sulfur adsorbing material in the desulfurizer 15. In another embodiment, for example when the extracted gas contains more than 1 vol. % of sulfur containing compounds, the extracted gas may be scrubbed in scrubber 9 to reduce sulfur containing compounds followed by a step of desulfurizing the scrubbed extracted gas by contact with a solid sulfur adsorbing material in desulfurizer 15 at some point in the process subsequent to scrubbing the extracted gas.

Desulfurization of the extracted gas by contacted with a solid sulfur adsorbing material may be conducted with conventional solid desulfurization materials for desulfurizing gases that are commercially available. In an embodiment of the process the solid desulfurization material is a commercially available material that acts as a sulfur adsorbent effective to adsorb sulfur from sulfur containing compounds that contact the material as the extracted gas is contacted with the material. Such sulfur adsorbing materials may include active metals including zinc oxide, copper oxide, aluminum oxide, a mixture of copper-zinc oxides, a mixture of copper-nickel oxides, and magnesium oxide, and nickel oxide and may include a support or binder formed of alumina, silica, alumina-silica, titania, or other refractory oxides.

The desulfurization is preferably conducted at a temperature at which sulfur in the sulfur containing compounds adsorbs to the solid desulfurization material but below a temperature at which sulfur adsorbed to the material is desorbed from the material. In an embodiment, the extracted gas may be contacted with a solid desulfurization material in the desulfurizer 15 at a temperature of from 100° C. to 350° C., more preferably at a temperature of from 150° C. to 300° C.

The extracted gas may be heated to a temperature effective to induce the partial oxidation of the extracted gas in the catalyst partial oxidation reactor. In an embodiment, the extracted gas may be heated in one or more heating elements prior to being fed to the catalytic partial oxidation reactor 13. More than one heating element may be used in the process of the invention to raise the temperature of the extracted gas to a selected temperature 1) to provide sufficient heating to raise the temperature of the extracted gas to the selected temperature, and/or 2) to permit other steps of the process, for example catalytic desulfurization, to be effected between the steps of initially heating the extracted gas in the first heating element and heating the extracted gas in any subsequent heating elements.

The extracted gas is heated to a temperature at or above the auto-ignition temperature of the extracted gas when combined with an oxygen containing gas in the catalytic partial oxidation reactor 13 in the presence of a partial oxidation catalyst so the extracted gas may be partially oxidized in the catalytic partial oxidation reactor 13. The auto-ignition temperature of the extracted gas when combined with an oxygen-containing gas is, at least in part, dependent on the activity of the partial oxidation catalyst in the partial oxidation reactor 13, and may be a temperature of at least 200° C., preferably at least 300° C., and is a temperature of less than 600° C., or may be at most 500° C., or at most 400° C., or may be a temperature of from 200° C. to less than 600° C., or a temperature of from 250° C. to 550° C., or from 200° C. to 400° C. In an embodiment, the extracted gas may be heated to a temperature of from 200° C. to less than 600° C., or from 250° C. to 550° C., or from 200° C. to 400° C. by exchange of heat with the oxidation product gas formed by catalytic partial oxidation of the extracted gas.

In a preferred embodiment of the process of the invention, the heating elements are heat exchangers. The extracted gas may be heated in a first heat exchanger 11, or in a first heat exchanger 11 and a second heat exchanger 17, prior to being fed to the catalytic partial oxidation reactor 13. Preferably, heat from the catalytic partial oxidation of the extracted gas is used to heat the extracted gas by feeding the oxidation product gas from the catalytic partial oxidation reactor 13 through the first heat exchanger 11, and optionally through a second heat exchanger 17 if a second heat exchanger 17 is utilized, to heat the extracted gas prior to catalytically partially oxidizing the extracted gas. The catalytic partial oxidation reactor may be operatively connected in gaseous communication with the first heat exchanger 11 through line 19 and may be operatively connected in gaseous communication with the second heat exchanger 17 through lines 19 21, where valves 23, 25, and 27 control the flow of the oxidation product gas to the first and second heat exchangers 11 and 17. In an embodiment, valves 23, 25, and 27 may be automatically controlled in response to temperature measurements made of the extracted gas exiting the first heat exchanger 11, and/or of the extracted gas exiting the second heat exchanger 17, and/or of the oxidation product gas entering or exiting the catalytic partial oxidation reactor 13 so that the temperature of the extracted gas and/or the oxidation product gas may be maintained at a selected level. Optionally, and less preferably, the extracted gas may be heated in the first heat exchanger 11, and optionally in a second heat exchanger 17 by passing steam through the first, and optionally second, heat exchangers to heat the extracted gas.

In an embodiment, the extracted gas may be heated to a temperature of from 100° C. to 350° C., or from 150° C. to 300° C. in a first heat exchanger 11, preferably by exchanging heat with a portion of the oxidation product gas from the catalytic partial oxidation reactor 13. Subsequently, either directly after heating the extracted gas in the first heat exchanger 11 or after one or more intervening process steps, the extracted gas may be heated to a temperature of from 250° C. up to but not including 600° C., or from 300° C. to 550° C. in a second heat exchanger 17, preferably by exchanging heat with a portion of the oxidation product gas from the catalytic partial oxidation reactor 13.

As noted above, the one or more steps expanding, desulfurizing, and heating the extracted gas may be coordinated to provide optimal conditioning of the extracted gas for catalytic partial oxidation. In a preferred embodiment, as shown in FIG. 1, the extracted gas may be initially expanded in expander 6 to a selected pressure, if expansion is necessary to reduce the pressure of the extracted gas to within a selected range. The extracted gas may then be scrubbed in scrubber 9 to remove a significant portion of sulfur containing compounds in the extracted gas if the extracted gas contains greater than 1 vol. % of such sulfur containing compounds. The extracted gas may then be heated in a first heat exchanger 11 to a temperature effective to permit catalytic desulfurization of the extracted gas, for example to a temperature of from 150° C. to 350° C. The extracted gas may then be catalytically desulfurized in desulfurizer 15 to remove most or all remaining sulfur containing compounds in the extracted gas. The extracted gas may then be heated in a second heat exchanger 17 to a temperature at or above the auto-ignition temperature of the extracted gas when mixed with an oxygen containing gas and contacted with a selected catalytic partial oxidation catalyst, preferably from 250° C. to 550° C. The heated extracted gas exiting the second heat exchanger 17 may be fed to a catalytic partial oxidation reactor 13 for catalytic partial oxidation. In a particularly preferred embodiment, the oxidation product gas produced by catalytic partial oxidation of the extracted gas is utilized to provide heat for heat exchange with the extracted gas in the first and second heat exchangers 11 and 17.

The well 3, expander 6, if present, scrubber 9, if present, first heat exchanger 11, desulfurizer 15, and second heat exchanger 17 may be operatively connected in gaseous communication by pipes or lines so the extracted gas may pass between the elements used to effect the steps of the process prior to catalytic partial oxidation of the extracted gas. For example, the expander 6 may be operatively connected in gaseous communication to the well 3 by line 5; the scrubber 9 may be operatively connected in gaseous communication with the expander 6 by line 29; the first heat exchanger 11 may be operatively connected in gaseous communication with the scrubber 9 by line 31; the desulfurizer 15 may be operatively connected in gaseous communication with the first heat exchanger by line 33; the second heat exchanger 17 may be operatively connected in gaseous communication with the desulfurizer 15 by line 35; and the catalytic partial oxidation reactor 13 may be operatively connected in gaseous communication with the second heat exchanger 13 by line 37.

An oxygen containing gas is also provided as a feed for the process for converting hydrocarbons in the extracted gas to one or more liquid hydrocarbons and/or one or more liquid hydrocarbon oxygenates, where the oxygen containing gas is fed to the catalytic partial oxidation reactor 13 to partially oxidize the extracted gas upon contact with the catalytic partial oxidation catalyst at a temperature above the auto-ignition temperature of the mixture of the extracted gas and the oxygen containing gas. The oxygen containing gas may be air, a gas comprising at least 90 vol. % oxygen, or substantially pure oxygen comprising at least 99 vol. % oxygen.

In a preferred embodiment, the oxygen containing gas comprises at least 90 vol. % oxygen to avoid including substantial amounts of nitrogen in the process (e.g. if air were used as the oxygen containing gas), since nitrogen merely takes up reactor volume, and may produce undesirable $NO_x$ compounds in the catalytic partial oxidation of the extracted gas. An oxygen containing gas comprising at least 90 vol. % oxygen may be provided by separating oxygen from air in a unit for separating oxygen from air 8. The unit 8 may be a conventional air separation unit, or a conventional vacuum pressure swing absorption unit, or a unit in which oxygen may be separated from air by membranes. Preferably the oxygen containing gas provided for use in the catalytic partial oxidation of the extracted gas comprises at least 99 vol. % oxygen, and is provided by separating oxygen from air in a conventional air separation unit.

Energy ($e^-$) to drive the unit 8 for separating oxygen from air may be provided by expansion of a hydrocarbon product gas or a hydrocarbon oxygenate product gas stream through an expander, as described in further detail below. If an expander 6 is used to reduce the pressure of the extracted gas, energy ($e^-$) produced by expansion of the extracted gas may also be used to drive the unit 8 to separate oxygen from air.

Nitrogen separated from the air in the air separation unit 8 may be cooled and collected as liquid nitrogen in the air separation unit 8. The liquid nitrogen may be used to cool various gas streams in the present process by exchanging heat with the gas stream to be cooled, as described in further detail below.

The oxygen-containing gas may be compressed to a pressure within a range from 1 MPa to 15 MPa, or from 5 MPa to 15 MPa, or to 10 MPa. In an embodiment, the oxygen-containing gas is compressed to a pressure within 1 MPa of the pressure of the extracted gas after any expansion of the extracted gas is effected. Energy ($e^-$) to compress the oxygen-containing gas may be provided by expansion of a hydrocarbon product gas or a hydrocarbon oxygenate product gas through an expander, as described in further detail below. If an expander 6 is used to reduce the pressure of the extracted gas, energy ($e^-$) produced by the expansion of the extracted gas may also be used to compress the oxygen-containing gas.

The oxygen containing gas is heated to a temperature at or above the auto-ignition temperature of the combined extracted gas and oxygen containing gas in the catalytic partial oxidation reactor 13 in the presence of a partial oxidation catalyst so the extracted gas may be partially oxidized in the catalytic partial oxidation reactor 13. As noted above with respect to the extracted gas, the auto-ignition temperature of the extracted gas when combined with an oxygen-containing gas is, at least in part, dependent on the activity of the partial oxidation catalyst in the partial oxidation reactor 13, and may be a temperature of at least 200° C., preferably at least 300° C., and is a temperature of less than 600° C., or may be at most 500° C., or at most 400° C., and may be a temperature of from 200° C. to less than 600° C., or a temperature of from 250° C. to 550° C., or from 200° C. to 400° C.

The oxygen-containing gas may be heated in one or more heaters to a selected temperature at or above the auto-ignition temperature of the combined extracted gas and oxygen-containing gas in the presence of a selected partial oxidation catalyst. The one or more heaters may be conventional heaters for heating a gas, including electrical heaters and heat exchangers. In a preferred embodiment, the heaters for heating the oxygen containing gas are heat exchangers. In an embodiment, the oxygen-containing gas may be heated to a temperature of from 100° C. to 350° C., or from 150° C. to 300° C. in a first heat exchanger 11, preferably by exchanging heat with a portion of the oxidation product gas from the catalytic partial oxidation reactor 13. Subsequently, the oxygen-containing gas may be heated to a temperature of from 250° C. up to but not including 600° C., or from 300° C. to 550° C. in a second heat exchanger 17, preferably by exchanging heat with a portion of the oxidation product gas from the catalytic partial oxidation reactor 13.

The oxygen-containing gas is mixed with the extracted gas in an amount effective to partially, but not fully, oxidize the hydrocarbons in the extracted gas upon catalyst-induced reaction of the mixture. Therefore, the oxygen-containing gas is mixed with the extracted gas in an amount such that the molar ratio of oxygen from the oxygen containing gas to carbon from the hydrocarbons of the extracted gas is less than one. Preferably, the oxygen-containing gas is mixed with the extracted gas in an amount such that the molar ratio of oxygen from the oxygen containing gas to carbon from the hydrocarbons in the extracted gas is at least 0.4 or at least 0.5, or at least 0.6, or at least 0.65, and is at most 0.99, or at most 0.95, or at most 0.90, or at most 0.85.

As shown in FIG. 1, air may be provided as an input stream through line 39. The air may be provided as the oxygen containing gas through line 41, or the air may be fed to a unit 8 for separating oxygen from air or for enriching the oxygen content of air, as described above. The oxygen containing gas, either air, oxygen enriched air, or substantially oxygen, may be fed to the first heat exchanger through line 43. Valve 45 may be used to control the rate that the oxygen containing gas is introduced into the process, in particular, to maintain the molar ratio of oxygen in the oxygen containing gas to carbon from the hydrocarbons in the extracted gas to less than one. Valves 47 and 49 may be used to direct the flow of the air input stream to the oxygen separation unit 8 or around the unit 8.

The oxygen containing gas may be heated in the first heat exchanger 11 by exchanging heat with the oxidation product gas from the catalytic partial oxidation of the oxygen containing gas and the extraction gas, and may subsequently be fed to the second heat exchanger 17 through line 51 for further heating by exchange of heat with the oxidation product gas in order to raise the temperature of the oxygen containing gas to a temperature at or above the auto-ignition temperature of the oxygen-containing gas and the extracted gas in the presence of a selected partial oxidation catalyst. The oxygen containing gas may then be fed from the second heat exchanger 17 to the catalytic partial oxidation reactor 13 for catalytically-induced reaction with the extracted gas through line 53, or may be mixed with the heated extracted gas exiting the second heat exchanger 17 prior to feeding the mixture to the catalytic partial oxidation reactor 13 for reaction. Optionally, though less preferably, the oxygen-containing gas and the extracted gas may be mixed prior to heating and may be heated together, or may be mixed after initially heating each gas separately, e.g. in the first heat exchanger, but prior to further heating, e.g. in the second heat exchanger—where the mixture is ultimately fed to the catalytic partial oxidation reactor for contact with a partial oxidation catalyst to induce reaction of the mixture.

In an embodiment, steam may be mixed with the oxygen containing gas and the extracted gas prior to or during reaction of the oxygen containing gas and the extracted gas. The steam may serve to inhibit the formation of carbon deposits in the catalytic partial oxidation reactor 13 and/or on the partial oxidation catalyst.

In an embodiment, steam may mixed with the oxygen containing gas and the extracted gas prior to or during partial oxidation reaction of the oxygen containing gas and the extracted gas to autothermally reform the steam and a portion of methane in the extracted gas according to the following reaction: $2CH_4+O_2+H_2O \rightarrow 5H_2+CO$. When steam is added for the purpose of autothermal reformation, the steam may be added to the mixture of the extracted gas and the oxygen containing gas in an amount such that the steam is present in the mixture in an amount of up to 13 wt. % of the mixture. When steam is utilized for the purpose of autothermal reformation, the amount of steam mixed with the extracted gas and the oxygen containing gas is selected to provide a molar ratio of steam to carbon from hydrocarbons in the extracted gas ($H_2O/C_{EC}$) of greater than 0 and less than 0.4.

If utilized, steam may be compressed to a pressure within a range from 1 MPa to 15 MPa, or from 5 MPa to 15 MPa, or to 10 MPa. In an embodiment, the steam is compressed to a pressure within 1 MPa of the pressure of the extracted gas after any expansion of the extracted gas is effected. Energy ($e^-$) to compress the steam may be provided by expansion of a hydrocarbon product gas or a hydrocarbon oxygenate product gas through an expander, as described in further detail below. If an expander 6 is used to reduce the pressure of the extracted gas, energy ($e^-$) produced by the expansion of the extracted gas may also be used to compress the steam.

Water or steam may be fed to one or more heaters or heat exchangers to heat the steam to a temperature of from at least 200° C., preferably at least 300° C., and to a temperature of less than 600° C., or at most 500° C., or at most 400° C., where the temperature may be a temperature of from 200° C. to less than 600° C., or a temperature of from 250° C. to 550° C., or from 200° C. to 400° C.

In a preferred embodiment, water or steam may be fed to the first heat exchanger 11 through line 55. Water or steam may be fed into the process through an inlet line 57 operatively coupled to line 55, or may be fed from a third heat exchanger 59, optionally used to cool the oxidation product gas or its water-gas shifted product as described below, through line 61 which may be operatively connected to line 55. The water or steam may be heated to produce heated steam in the first heat exchanger 11 by exchange of heat with the oxidation product gas produced by the catalytic partial oxidation of the oxygen containing gas and the extracted gas. The heated steam may be fed from the first heat exchanger 11 to the second heat exchanger 17 through line 63 for further heating, or optionally may be fed directly into the catalytic partial oxidation reactor 13 for mixing with the oxygen containing gas and the extracted gas during reaction, or may be mixed with either or both the oxygen containing gas and/or the extracted gas prior to feeding the mixture to the catalytic partial oxidation reactor 13 for reaction. If the steam is fed to the second heat exchanger 17 for further heating, the steam may be heated further in the second heat exchanger by exchanging heat with a portion of the oxidation product gas. The resulting steam may be fed directly to the catalytic partial oxidation reactor 13 from the second heat exchanger 17 through line 65, or the steam may be mixed with either or both the oxygen containing gas and/or the extracted gas prior to feeding the mixture to the catalytic partial oxidation reactor 13 for reaction.

The heated oxygen containing gas and the heated extracted gas, if not previously mixed, may be mixed upon introduction into the catalytic partial oxidation reactor 13. The mixture, regardless of when mixed, is then reacted in an exothermic catalytic partial oxidation reaction to produce an oxidation product gas, optionally in the presence of steam, in the catalytic partial oxidation reactor 13. The oxidation product gas contains the reaction products from the reaction of oxygen in the oxygen containing gas and hydrocarbons, particularly methane, in the extracted gas, plus the carbon dioxide present in the extracted gas-which is substantially unreactive but retards the oxidation reaction to maintain the temperature of the oxidation product gas below 600° C. The oxygen in the oxygen containing gas and the methane in the extraction gas react as follows:

where the reaction product is primarily a synthesis gas comprising hydrogen and carbon monoxide, where hydrogen is present in a 2:1 molar ratio relative to carbon monoxide. The oxidation product gas, therefore, contains hydrogen, carbon monoxide, and carbon dioxide as its main constituents, and optionally contains steam if water/steam was added to the mixture of the extracted gas and the oxygen-containing gas.

The oxidation reaction is maintained at a low temperature such that the oxidation product gas exiting the catalytic partial oxidation reactor has a temperature of below 600° C. The temperature of the oxidation reaction is maintained at a temperature of below 600° C. by 1) controlling the temperature of the extracted gas and/or oxygen containing gas feeds to be mixed and reacted, where the feed temperatures of the extracted gas and/or oxygen containing gas may be lowered to reduce the temperature of the oxidation product gas; and/or 2) controlling the temperature of any steam added to the reaction mixture to regulate the reaction temperature, where the feed temperature of steam added to the reaction mixture may be lowered to reduce the temperature of the oxidation product gas; and/or 3) adjusting the molar ratio of oxygen in the oxygen containing gas to carbon in hydrocarbons in the extracted gas, where the ratio of oxygen in the oxygen containing gas to carbon in hydrocarbons in the extracted gas may lowered to reduce the temperature of the oxidation product gas; and/or 4) adjusting the ratio of the feed rate of the oxygen containing gas to the extracted gas to decrease the amount of oxygen containing gas relative to the extracted gas present in the reaction and thereby increase the overall carbon dioxide concentration present in the reaction to reduce the temperature of the oxidation product gas.

The partial oxidation of the hydrocarbons present in the extracted gas is effected by mixing the extracted gas and the oxygen containing gas, and optionally steam, and contacting the mixture of extracted gas and oxygen containing gas with a highly reactive catalytic partial oxidation catalyst, where the mixture has a temperature of from 200° C. up to, but not including, 600° C. As discussed above, the extracted gas and the oxygen containing gas, and optionally steam, may be mixed prior to being fed to the catalytic partial oxidation reactor 13. Alternatively, the extracted gas and the oxygen containing gas, and optionally steam, may be initially mixed in the catalytic partial oxidation reactor 13 prior to contacting the catalyst.

The partial oxidation of the hydrocarbons present in the extracted gas may be conducted at an elevated pressure. In an embodiment, the pressure at which the mixture of extracted gas and the oxygen-containing gas, and optionally steam, may be reacted may range from 1.5 MPa to 15 MPa, or from 5 MPa to 15 MPa, or at 10 MPa. The pressure of the mixture of extracted gas, the oxygen-containing gas, and optionally steam, is determined by the pressure of the individual component gases, which may be controlled as described above.

The catalyst utilized to effect the partial oxidation of the mixture of hydrocarbons in the extracted gas and oxygen in the oxygen containing gas must have sufficient catalytic activity to effect oxidation (partial) of hydrocarbons, particularly methane, in the mixture at a temperature of from 200° C. up to, but not including, 600° C., and preferably from a temperature of from 250° C. to 550° C. "Sufficient catalytic activity", as used with respect to the partial oxidation catalyst at a temperature of from 200° C. up to, but not including, 600° C. is defined as: catalytic activity sufficient to effect partial oxidation of at least 85 mol % of hydrocarbons in the extracted gas at a gas hourly space velocity of at least 20,000 NL/kg/h (expressed as normal liters of gas per kilogram of catalyst per hour, wherein normal liters refers to liters under STP conditions, i.e. 25° C. and 1 atm.).

The catalyst utilized in the process of the present invention to effect the low temperature partial oxidation reaction of the mixture of the extracted gas and the oxygen containing gas comprises one or more catalytically active metals selected from the group consisting of rhodium, iridium, ruthenium, and platinum. Catalysts comprising rhodium and/or iridium are preferred. The catalytically active metals of the catalyst may be intimately associated as an admixture when two or more of the metals are present in the catalyst so each metal may affect the catalytic performance or stability of one or more other metals present in the catalyst. As used herein, the catalytically active metals of the catalyst are "intimately associated as an admixture" when at least 50%, or at least 90% of each catalytically active metal is present as part of the catalyst within a distance of 10 μm, or within a distance of 5 μm, of at least one of the other catalytically active metals. The admixture of catalytically active metals may be an alloy of the metals—where the presence of an alloy can be determined by methods known in the art, for example by XRD. In an embodiment, the catalyst used in the process of the invention utilizes an alloy of rhodium and iridium to provide catalytic activity in the catalytic partial oxidation reaction of the mixture of the extracted gas and the oxygen containing gas. In an embodiment, the catalyst for effecting the partial oxidation reaction of the mixture of the extracted gas and the oxygen containing gas may comprise rhodium and iridium in the form of wires or gauzes of a rhodium-iridium alloy.

The one or more catalytically active metals of the partial oxidation catalyst may be supported on a catalyst carrier material. Suitable catalyst carrier materials are known in the art and include metals and refractory oxides such as silica, alumina, titania, zirconia, and mixtures thereof. High-alloy alumina containing steel, such as FeCrALLOY®-type materials are suitable metals for the catalyst carrier. Zirconia-based refractory oxides, particularly including at least 70 wt. % zirconia, are preferred refractory oxide materials for the catalyst carrier. Such zirconia-based refractory oxides may be stabilized or partially stabilized by one or more oxides of Mg, Ca, Al, Y, La, or Ce. Particularly suitable carrier materials are Ce-ZTA (zirconia-toughened alumina) and Y-PSZ (partially stabilized zirconia), both commercially available. Structured ceramic supports having a honeycomb-like structure may also be used as the catalyst carrier.

The one or more catalytically active metals of the partial oxidation catalyst may be deposited on the catalyst carrier material by techniques known in the art. In one embodiment, the one or more catalytically active metals of the partial oxidation catalyst may be deposited on the catalyst carrier material by impregnation. The carrier may be impregnated with one or more solutions of the one or more catalytically active metals, then the carrier impregnated with the one or more catalytically active metals may be dried to form the catalyst, and then, optionally, the dried catalyst may be calcined. If the catalyst comprises more than one catalytically active metal, the catalytically active metals may be combined in one solution for impregnating the carrier, or, optionally, the carrier may be impregnated with separate solutions of each catalytically active metal sequentially. In another embodiment, the one or more catalytically active metals may be deposited on the catalyst carrier by wash coating.

The partial oxidation catalyst comprises the one or more catalytically active metals in any suitable amount to achieve the required catalytic activity to enable the reaction of the mixture of the oxygen containing gas and the extracted gas at a temperature of less than 600° C., or at most 500° C., or at most 400° C., or at most 300° C. In an embodiment, the partial oxidation catalyst comprises from 0.02 wt. % to 10 wt. %, or from 0.1 wt. % to 7.5 wt. %, of the one or more catalytically active metals. In an embodiment, the partial oxidation catalyst comprises rhodium and iridium as catalytically active metals where the rhodium and iridium comprise from 0.02 wt. % to 10 wt. % of the partial oxidation catalyst, and the rhodium-to-iridium weight ratio may be in the range of from 0.1 to 10, or from 0.2 to 5, or from 0.5 to 2.

The catalytically active metals of the partial oxidation catalyst may be associated with one or more inorganic metal cations. The one or more inorganic metal cations may be selected from Columns 2, 3, 4, 13, and 14 of the Periodic Table and the lanthanides, for example, Al, Mg, Zr, Ti, La, Hf, Si, and Ba, where Zr is preferred. The one or more inorganic metal cations may be intimately associated in an admixture with the one or more catalytically active metals of the partial oxidation catalyst, where the cation to catalytically active metal ratio may be in excess of or equal to 1.0, or 2.0, or 3.0 at the surface of the catalyst.

The partial oxidation catalyst used in the process of the present invention may be in any form accessible for a mixture of the extracted gas and the oxygen containing gas, and optionally steam, to contact the one or more catalytically active metals, and optionally the associated one or more inorganic metal cations, so that a partial oxidation reaction of the mixture may be effected. For example, the partial oxidation catalyst may be in the form of a porous monolithic structure such as a honeycomb or a foam, a fixed bed of catalyst particles, an arrangement of metal wire or gauze, or combinations thereof.

Catalysts effective for use as the partial oxidation catalyst in the process of the present invention are available commercially, for example, from CRI Catalyst Company, 16825 Northchase Drive, Houston, Tex. 77060, USA.

After catalytic partial oxidation of the mixture of the extracted gas and the oxygen containing gas, and optionally steam, the oxidation product gas is removed from the catalytic partial oxidation reactor 13. As noted above, the oxidation product gas may have a temperature of up to, but not including, 600° C., and is comprised of hydrogen, carbon monoxide, and carbon dioxide, and optionally steam.

The oxidation product gas is used as a feedstock for producing a hydrocarbon product or a hydrocarbon oxygenate product. In an embodiment, the oxidation product gas is used as a feedstock for a methanolation reaction to produce methanol. In another embodiment, the oxidation product gas is used as a feedstock for a Fisher-Tropsch reaction to produce a hydrocarbon product.

The oxidation product gas may be conditioned prior to being utilized as a feedstock for producing a hydrocarbon oxygenate product or a hydrocarbon product. The oxidation product gas may be conditioned by one or more optional steps, including 1) cooling the oxidation product gas; and 2) effecting a water-gas shift reaction using the oxidation product gas as a feedstock to increase the hydrogen content of the oxidation product gas.

The oxidation product gas may be cooled in one or more steps to adjust the temperature of the oxidation product gas to a temperature suitable for converting the oxidation product gas to a hydrocarbon oxygenate product or a hydrocarbon product, and, optionally, to a temperature suitable for effecting a water-gas shift reaction in the oxidation product gas prior to converting the oxidation product gas to a hydrocarbon oxygenate product or a hydrocarbon product. The oxidation product gas may have a temperature of from 200° C. up to, but not including, 600° C., and typically will have a temperature of from 400° C. up to, but not including, 600° C., more typically from 500° C. up to, but not including, 600° C. In the process of the invention, the hydrogen content of the oxidation product gas may be increased in a water-gas shift reaction which may be effected at a selected temperature in the range of from 200° C. to 400° C., and if the temperature of the oxidation product gas is above a selected temperature for effecting a water-gas shift reaction, the oxidation product gas may be cooled to the selected temperature. Further, in the process of the invention, the oxidation product gas or its water-gas shifted product (the water-gas shifted oxidation product gas) may be converted to a hydrocarbon product at a selected temperature in the range of from 200° C. to 400° C. or a hydrocarbon oxygenate product at a selected temperature in the range of from 200° C. to 300° C., therefore, if the oxidation product gas or its water-gas shifted product has a temperature above a selected temperature for converting the oxidation product gas or the water-gas shifted oxidation product gas to a hydrocarbon oxygenate product or a hydrocarbon product, the oxidation product gas or its water-gas shifted product must be cooled to the selected temperature. In an embodiment of the process, the oxidation product gas, as either the oxidation product gas itself or as the oxidation product gas and/or its water-gas shifted product gas, may be cooled at most 400° C., or at most 300° C., or at most 200° C. prior to converting the oxidation product gas or water-gas shifted oxidation product gas to a hydrocarbon oxygenate product or a hydrocarbon product.

In a preferred embodiment, as described above, the oxidation product gas may be cooled by exchanging heat with the extracted gas, and/or the oxygen containing gas, and/or steam in the first heat exchanger 11 and/or the second heat exchanger 17. The oxidation product gas may be cooled by up to 300° C., or up to 250° C., or up to 200° C., or up to 150° C. in the first heat exchanger 11 and/or the second heat exchanger 17. In an embodiment, the oxidation product gas produced by the catalytic partial oxidation reaction of the mixture of the extracted gas and the oxygen containing gas, and optionally steam, has a temperature of from 400° C. up to, but not including, 600° C. prior to being cooled by exchanging heat with the extracted gas and/or the oxygen containing gas and/or steam in either the first heat exchanger 11 and/or the second heat exchanger 17, and has a temperature of from 200° C. to 500° C., or from 250° C. to 400° C. after being cooled by such heat exchange.

In an embodiment, the oxidation product gas or its water-gas shifted product may be cooled by heat exchange with water, steam, liquid nitrogen from the air separation unit 8, or other coolant in one or more third heat exchangers 59, preferably at most 400° C., or at most 300° C., or at most 200° C., or at most 100° C. In an embodiment, the oxidation product gas or its water-gas shifted product is not cooled by heat exchange with the extracted gas, or the oxygen containing gas, or water/steam in the first heat exchanger 11 or second heat exchanger 17, but is cooled by heat exchange with water, steam, liquid nitrogen from the air separation unit 8, or other coolant in the one or more third heat exchangers 59. More preferably, the oxidation product gas is cooled by heat exchange with the extracted gas and/or the oxygen-containing gas and/or water/steam in the first heat exchanger 11 and/or the second heat exchanger 17 and subsequently the cooled oxidation product gas or its water-gas shifted product gas is cooled by exchange of heat with water, steam, liquid nitrogen from the air separation unit 8, or other coolant in the one or more third heat exchangers 59.

Water or steam or other coolant may be fed to the one or more third heat exchangers 59 through inlet line 67 at a flow rate sufficient to cool the oxidation product gas or water-gas shifted oxidation product gas to a selected temperature. The flow rate of the water or steam or other coolant to the one or more third heat exchangers may be controlled by adjusting third heat exchanger coolant inlet valve 69. In an embodiment, heated steam produced from cooling the oxidation product gas or the water-gas shifted oxidation product gas in the one or more third heat exchangers 59 may be fed to the first heat exchanger through lines 61 and 55 to cool the oxidation product gas and to be mixed with the extracted gas and the oxygen-containing gas in the catalytic partial oxidation reaction.

In an embodiment, the hydrogen content of the oxidation product gas may be increased by contacting the oxidation product gas, a water-gas shift catalyst, and steam at a temperature of from 200° C. to 400° C. in a water-gas shift reactor 71, where additional steam may be fed into the water-gas shift reactor 71 through steam inlet line 73. For example, the hydrogen content of the oxidation product gas may be increased if the oxidation product gas is to be converted to a hydrocarbon oxygenate, e.g. methanol, since conversion of the oxidation product gas to a hydrocarbon oxygenate may require a higher concentration or partial pressure of hydrogen than is present in the oxidation product gas.

Contact of the oxidation product gas, a water-gas shift catalyst, and steam at a temperature of from 200° C. to 400° C. in the water gas shift reactor 71 converts carbon monoxide and steam to hydrogen and carbon dioxide as follows:

$$CO + H_2O \leftrightharpoons CO_2 + H_2$$

where the production of hydrogen is energetically favored at temperatures in the range of from 200° C. to 400° C. despite the presence of excess carbon dioxide in the oxidation product gas. The temperature at which the oxidation product gas is contacted with the water-gas shift catalyst to effect the reaction may be selected to adjust the relative molar ratio of carbon monoxide to hydrogen, where lower temperatures within the range of 200° C. to 400° C. result in higher conversion of carbon monoxide to carbon dioxide and thus a higher molar hydrogen to carbon monoxide ratio, and higher temperatures in this temperature range result in lower conversion of carbon monoxide to carbon dioxide and thus a lower molar hydrogen to carbon monoxide ratio than water-gas shift reactions run at lower temperatures within the temperature range. The presence of carbon dioxide in the oxidation product gas helps inhibit the reaction going to completion and converting all carbon monoxide present in the oxidation product gas to hydrogen so that the water-gas shifted oxidation product gas may be utilized as a feed to produce a hydrocarbon product or a hydrocarbon oxygenate product. The water-gas shifted oxidation product gas may contain primarily hydrogen, carbon monoxide, carbon dioxide and steam.

The water-gas shift catalyst contacted with the oxidation product gas to produce the water-gas shifted oxidation product gas may be a commercially available conventional water-gas shift catalyst. The water-gas shift catalyst may comprise a catalytically active transition metal or transition metal oxide selected from the group comprising Fe, Zn, Cr, Cu, Ni, Co, their oxides, and mixtures thereof. The catalytically active transition metal or transition metal oxide may be supported on an alumina, titania, zirconia, and/or silica support. In an embodiment, the water-gas shift catalyst may be chromium-promoted magnetite ($Fe_3O_4$), particularly for shift reactions effected at temperatures from 350° C. to 400° C., or in another embodiment the catalyst may contain a mixture of CuO (30-70 wt. %), ZnO (20-50 wt. %), and $Al_2O_3$ (5-40 wt. %), particularly for shift reactions effected at temperatures of from 200° C. to 350° C. Preferably the water-gas shift catalyst is supported in a fixed bed in the shift reactor 71.

The system for conducting the process of the present invention may be configured for conducting the process optimally, depending on the cooling and/or heat exchange required and the relative hydrogen and carbon monoxide content of the oxidation product gas to be used as a feedstock to produce a hydrocarbon oxygenate product or a hydrocarbon product. As noted above, the oxidation product gas may be fed from the catalytic partial oxidation reactor 13 to the first heat exchanger 11 and/or the second heat exchanger 17 for heat exchange with the extracted gas, the oxygen containing gas, and optionally steam, through lines 19 and 21, where valves 23 and 25 may be used to control the flow of the oxidation product gas to the respective first and second heat exchangers 11 and 17. In an embodiment (not shown) the oxidation product gas may be fed from the catalytic partial oxidation reactor to the second heat exchanger for heat exchange with the extracted gas, the oxygen-containing gas, and optionally steam, and the cooled oxidation product gas exiting the second heat exchanger may be fed to the first heat exchanger for further cooling by exchanging heat with the extracted gas, the oxygen-containing gas, and optionally steam.

The cooled oxidation product gas exiting the first heat exchanger 11 may be fed to the water-gas shift reactor 71 through line 75, or, may be fed to the one or more third heat exchangers 59 through lines 77, 79, 81, and 83 without passing the cooled oxidation product gas through the water gas shift reactor 71, or may be passed directly to reactor 89 for converting the oxidation product gas to a hydrocarbon product or a hydrocarbon oxygenate product through lines 75, 77, 79, 85, and 87 without passing the cooled oxidation product gas through the water gas shift reactor 71 or the one or more third heat exchangers 59. Valves 91, 93, 95, and 97 may be adjusted to control the flow of the oxidation product gas from the first heat exchanger 11 to the water-gas shift reactor 71, the one or more third heat exchangers 59, or to the reactor 89.

Similarly, the cooled oxidation product gas exiting the second heat exchanger 17 may be fed to the water-gas shift reactor 71 through lines 99, 101, and 75, or, may be fed to the one or more third heat exchangers 59 through lines 99, 101, 79, 81 and 83 without passing the cooled oxidation product gas through the water-gas shift reactor 71, or, may be passed directly to reactor 89 for converting the cooled oxidation product gas to a hydrocarbon product or a hydrocarbon oxygenate product through lines 99, 101, 79, 85, and 87 without passing the cooled oxidation product gas through the water-gas shift reactor 71 or the one or more third heat exchangers 59. Valves 103, 109, 95, and 97 may be adjusted to control the flow of the oxidation product gas from the second heat exchanger 17 to the water-gas shift reactor 71, the one or more third heat exchangers 59, or to the reactor 89.

Optionally, but less preferably, the oxidation product gas is not cooled by heat exchange with the extracted gas and the oxygen-containing gas, and optionally steam, in the first and second heat exchangers 11 and 17, but is fed directly from the catalytic partial oxidation reactor 13 to either the water-gas shift reactor 71, or a third heat exchanger 59, or the reactor 89 for converting the oxidation product gas to a hydrocarbon oxygenate product or a hydrocarbon product. The oxidation product gas may be fed directly from the catalytic partial oxidation reactor 13 to the water-gas shift reactor 71 when the temperature of the oxidation product gas is from 200° C. to 400° C. and it is desirable to increase the molar ratio of hydrogen to carbon monoxide in the oxidation product gas. The oxidation product gas may be fed directly from the catalytic partial oxidation reactor 13 to the reactor 89 when the oxidation product gas has a temperature of from 200° C. to 400° C. and the oxidation product gas is utilized to produce a hydrocarbon product gas or when the oxidation product gas has a temperature of from 200° C. to 300° C. and the oxidation product gas is utilized to produce a hydrocarbon oxygenate product gas. The oxidation product gas may be fed directly to the third heat exchanger 59 when increasing the molar ratio of hydrogen to carbon monoxide is not desired and when the oxidation product gas may be cooled sufficiently in the third heat exchanger 59 so that the cooled oxidation product gas has a temperature of from 200° C. to 400° C. when the oxidation product gas is utilized to produce a hydrocarbon product gas or has a temperature of from 200° C. to 300° C. when utilized to produce a hydrocarbon oxygenate product gas.

The oxidation product gas may be fed directly from the catalytic partial oxidation reactor 13 to the water-gas shift reactor 71, or the third heat exchanger 59, or the reactor 89 by directing the flow of the oxidation product gas to the selected element while precluding flow of the oxidation product gas to the first and second heat exchangers 11 and 17. The oxidation product gas may be directed from the catalytic partial oxidation reactor 13 to the water-gas shift reactor through lines 79 and 105, where valves 27 and 107 may control the flow of the oxidation product gas from the catalytic partial oxidation reactor 13 to the water-gas shift reactor 71. The oxidation product gas may be directed from the catalytic partial oxidation reactor 13 to the third heat exchanger through lines 79 and 81, and the oxidation product gas may be directed to the reactor 89 through the lines 79 and 85. Flow to the first and second heat exchangers 11 and 17 may be precluded by closing valves 23 and 25.

As can be seen above, in certain embodiments of the process of the invention, certain steps of conditioning the oxidation product gas to be converted to a hydrocarbon product gas or a hydrocarbon oxygenate product gas may be omitted. Therefore, in certain embodiments, a system for effecting the process of the invention need not include unnecessary elements.

In an embodiment, for example when the oxidation product gas is to be used as a feedstock for a Fisher-Tropsch reaction, no additional hydrogen may be needed in the oxidation product gas, and the step of contacting the oxidation product gas with a water-gas shift catalyst need not be conducted. In this embodiment, the water-gas shift reactor 71 may be excluded from the system for practicing the process of the invention, and the oxidation product gas may be fed from the catalytic partial oxidation reactor 13 to the first and/or second heat exchangers 11 and 17 for cooling and subsequently to the third heat exchanger 59 for further cooling, or the oxidation product gas may be fed directly from the catalytic partial oxidation reactor 13 to the third heat exchanger 59 for cooling. The cooled oxidation product gas may then be fed to reactor 89 as a feedstock for conversion into one or more hydrocarbons or into one or more hydrocarbon oxygenates.

In an embodiment, for example when the water-gas shifted oxidation product gas exiting the water-gas shift reactor 71 has a temperature within a selected range of temperatures for converting the water-gas shifted oxidation product gas to a hydrocarbon product or a hydrocarbon oxygenate product in reactor 89, the step of cooling the water-gas shifted oxidation product gas in one or more third heat exchangers 59 need not be conducted. In this embodiment, the one or more third heat exchangers 59 may be excluded from the system for practicing the process of the invention, and the water-gas shifted oxidation product gas may be fed directly from the water-gas shift reactor 71 to the reactor 89 as a feedstock for conversion into one or more hydrocarbons or into one or more hydrocarbon oxygenates.

In an embodiment, for example, when 1) no additional hydrogen may be needed in the oxidation product gas and the step of contacting the oxidation product gas with a water-gas shift catalyst need not be conducted; and 2) when the oxidation product gas exiting the catalytic partial oxidation reactor or the cooled oxidation product exiting the first heat exchanger 11 and/or the second heat exchanger 17 has a temperature within a selected range of temperatures for converting the oxidation product gas to a hydrocarbon product or a hydrocarbon oxygenate product in reactor 89, the step of contacting the oxidation product gas with a water-gas shift catalyst need not be conducted and the step of cooling the oxidation product gas or the water-gas shifted oxidation product gas in one or more third heat exchangers 59 need not be conducted. In this embodiment, the water-gas shift reactor 71 and the one or more third heat exchangers 59 may be excluded from the system for practicing the process of the invention, and the oxidation product gas may be fed directly from the catalytic partial oxidation reactor 13 to the reactor 89 and/or the cooled oxidation product gas may be fed from the first heat exchanger 11 and/or the second heat exchanger 17 directly to the reactor 89.

At a selected temperature, in one embodiment attained by cooling, the oxidation product gas or the water-gas shifted oxidation product gas is reacted to form a hydrocarbon oxygenate product gas, preferably methanol, or is reacted to form a hydrocarbon product gas, preferably a Fisher-Tropsch reaction product mixture. The oxidation product gas or the water-gas shifted oxidation product gas may be reacted to form a hydrocarbon oxygenate product gas or a hydrocarbon product gas by contacting the oxidation product gas or water-gas shifted oxidation product gas with a selected catalyst. The oxidation product gas or the water-gas shifted oxidation product gas may be contacted with the selected catalyst in a reactor 89.

In one embodiment of the process of the invention, the oxidation product gas or water-gas shifted oxidation product gas is contacted with a catalyst selected so that a hydrocarbon oxygenate product gas may be produced by contact of the catalyst with the oxidation product gas or water-gas shifted oxidation product gas. In this embodiment, the oxidation product gas or water-gas shifted oxidation product gas may be contacted with the selected catalyst, preferably by passing the oxidation product gas or water-gas shifted oxidation product gas over and/or through a fixed bed of the catalyst, in the reactor 89 at a temperature of from 200° C. to 300° C. The resulting hydrocarbon oxygenate product gas may be comprised of a hydrocarbon oxygenate gas, hydrogen, and carbon dioxide, where the hydrocarbon oxygenate product gas typically may have a temperature of from 200° C. to 300° C. upon exiting the reactor 89.

In a preferred embodiment the hydrocarbon oxygenate produced by contact of the oxidation product gas or water-gas shifted oxidation product gas with the selected catalyst at a temperature of from 200° C. to 300° C. is methanol. The resulting hydrocarbon oxygenate product may be comprised of methanol gas, hydrogen, and carbon dioxide. Methanol may be formed from the oxidation product gas or the water-gas shifted oxidation product gas according to the following reaction:

$$CO + 2H_2 \leftrightarrows CH_3OH$$

where carbon dioxide may be involved mechanistically in the reaction, and increases the reaction rate. The large quantity of carbon dioxide in the oxidation product gas or the water-gas shifted oxidation product gas, therefore, is useful to increase the rate that methanol may be formed from contact of catalyst with the oxidation product gas or the water-gas shifted oxidation product gas.

The catalyst useful for catalyzing conversion of the oxidation product gas or water-gas shifted oxidation product gas to methanol may be selected from conventional commercially available catalysts for effecting conversion of a gas containing CO, $H_2$, and optionally $CO_2$, to methanol. Such catalysts may be formed of copper, zinc, and/or aluminum metals or their oxides. In an embodiment, a methanol catalyst may include from 0 to 20 wt. % Zn, from 40 to 50 wt. % Cu, and from 40 to 50 wt. % Al. In one embodiment, the methanol catalyst may be a copper-zinc-aluminum alloy. One such alloy may be formed of a $Cu/ZnO/Al_2O_3$ mixture.

In another embodiment of the process of the invention, the oxidation product gas or water-gas shifted oxidation product gas is contacted with a catalyst selected so that a hydrocarbon product gas may be produced in a Fisher-Tropsch synthesis by contact of the catalyst with the oxidation product gas or water-gas shifted oxidation product gas. The Fisher-Tropsch synthesis is a reductive oligomerization of carbon monoxide over a heterogeneous catalyst that produces hydrocarbons of various forms including paraffins, olefins, and aromatics, where the hydrocarbons vary in carbon chain length and/or content. In this embodiment, the oxidation product gas or water-gas shifted oxidation product gas may be contacted with the selected Fisher-Tropsch catalyst, preferably by passing the oxidation product gas or water-gas shifted oxidation product gas over and/or through a fixed bed of the catalyst, in the reactor 89 at a temperature of from 200° C. to 400° C. The hydrocarbon product gas may contain one or more hydrocarbons, hydrogen, carbon dioxide, and steam, and typically has a temperature of from 200° C. to 400° C. upon exiting the reactor 89.

A preferred hydrogen to carbon monoxide molar ratio for effecting the Fisher-Tropsch reaction is 2:1. The oxidative product gas formed in the catalytic partial reactor typically has a molar ratio of hydrogen to carbon monoxide of about 2:1, therefore, the oxidative product gas generally need not be subjected to a water-gas shift conversion to increase hydrogen content of the oxidative product gas prior to contacting the oxidation product gas with the catalyst in the reactor 89 in a Fisher-Tropsch type conversion to produce the hydrocarbon product gas.

The catalyst useful for catalyzing conversion of the oxidation product gas in a Fisher-Tropsch synthesis may be selected from conventional commercially available Fisher-Tropsch type catalysts. Such catalysts may comprise, as the catalytically active component, one or more metals from Columns 8, 9, and/or 10 of the Periodic Table, where cobalt, nickel, iron, and ruthenium are particularly useful as catalytically active components of the Fisher-Tropsch catalyst. The catalyst may also include one or more promoters selected from one or more metals or metal oxides from Columns 2, 3, 4, 5, or 6 of the Periodic Table or the actinides or lanthanides, where oxides of magnesium, calcium, strontium, barium, scandium, yttrium, lanthanum, cerium, titanium, zirconium, hafnium, thorium, uranium, vanadium, chromium, and manganese are suitable promoters.

The catalytically active metal may be supported on a porous carrier. The porous carrier may be selected from any of the suitable refractory metal oxides or silicates or combinations thereof known in the art. Particular examples of such porous carriers include silica, alumina, titania, zirconia, ceria, gallia, and mixtures thereof, preferably silica, alumina, and titania.

The amount of catalytically active metal in the catalyst may range from 2 wt. % to 75 wt. % of the catalyst, or from 3 wt. % to 40 wt. %, or from 5 wt. % to 25 wt. % of the catalyst.

The resulting hydrocarbon oxygenate product gas, from converting the oxidation product gas to a hydrocarbon oxygenate product, or the resulting hydrocarbon product gas, from converting the oxidation product gas in a Fisher-Tropsch reaction to a hydrocarbon product, may optionally be passed from the reactor 89 to a hydrogen separator 111 via line 113. Hydrogen present in either the hydrocarbon oxygenate product gas or the hydrocarbon product gas may be separated in the hydrogen separator 111 and recycled back into the reactor 89 through line 115 or separated as a hydrogen gas product. It may be particularly useful to recycle hydrogen back into the reactor 89 if the oxidation product gas is converted to methanol, as an excess of hydrogen facilitates the conversion.

The hydrogen separator 111 preferably is effective at separating hydrogen as a low pressure gas from the hydrocarbon oxygenate product gas or the hydrocarbon product gas while maintaining the hydrocarbon oxygenate product gas or the hydrocarbon product gas at a higher pressure. For example, the hydrogen separated from the hydrocarbon oxygenate product gas or the hydrocarbon product gas may have a pressure of from 0.1 MPa to 2 MPa, while the hydrocarbon oxygenate product gas or the hydrocarbon product gas may have a pressure of from 5 MPa to 15 MPa.

Hydrogen separated by the hydrogen separator 111 that is to be recycled back into reactor 89 may need to be compressed to the pressure of the oxidation product gas or water-gas shifted oxidation product gas before being fed to the reactor 89. The separated hydrogen may be compressed by a compressor 117 to increase the pressure of the separated hydrogen prior to feeding the separated hydrogen back into the reactor 89. The separated hydrogen may be compressed to a pressure of from 5 MPa to 15 MPa. Energy ($e^-$) to drive the compressor 117 may be supplied from energy ($e^-$) produced by the expander 119, as described below.

In an embodiment, the hydrogen separator 111 comprises a hydrogen-permeable, hydrogen-selective membrane through which hydrogen—but no other components of the hydrocarbon oxygenate product gas or hydrocarbon product gas—may pass, and that is effective for operating at temperatures up to 400° C. Such a hydrogen-separation membrane may comprise a support coated with a thin layer of a metal or alloy that is selectively permeable to hydrogen. The support may be formed of a ceramic or metallic material that is porous to hydrogen. Porous stainless steel or porous alumina are preferred materials for the support of the membrane. The hydrogen selective metal or alloy coated on the support may be selected from metals from the group consisting of Pd, Pt, Ni, Ag, Ta, V, Y, Nb, Ce, In, Ho, La, Au, and Ru, and mixtures thereof, particularly in the form of alloys. Palladium and platinum alloys are preferred. A particularly preferred membrane useful in the present process has a very thin film of a palladium alloy having a high surface area coating a porous stainless steel support. Membranes of this type can be prepared using the methods disclosed in U.S. Pat. No. 6,152,987. Thin films of platinum or platinum alloys having a high surface area would also be suitable as the hydrogen selective material. The hydrogen-permeable, hydrogen-selective membrane may be in the form of a tube that the hydrocarbon oxygenate product gas or the hydrocarbon product gas may contact as either product gas passes through the hydrogen separator 111.

Alternatively, in an embodiment of the process, hydrogen is not separated from the hydrocarbon oxygenate product gas or the hydrocarbon product gas, and no hydrogen separator 111 or compressor 117 is included in the system for practicing the process.

The hydrocarbon oxygenate product gas or hydrocarbon product gas, optionally less the hydrogen that had been present in these product gases, may be passed to an expander 119 via line 121. The hydrocarbon oxygenate product gas or the hydrocarbon product gas may be expanded through the expander 121 to depressurize the gas and to generate energy ($e^-$) as the gas is expanded through the expander 121. The expander 121 may be, for example, a turbine, where passage of the hydrocarbon oxygenate product gas or the hydrocarbon product gas through the turbine generates electricity.

The energy ($e^-$) produced by expanding the hydrocarbon oxygenate product gas or the hydrocarbon product gas through the expander 119 may be, and preferably is, sufficient to drive the unit 8 for separating oxygen from air, if utilized in the system for practicing the process, and to compress the hydrogen separated in the hydrogen separator 111 in compressor 117, again, if utilized in the system for practicing the process. The expander 119, therefore, may be operatively connected, e.g. by electrical connections, with the unit 8 for separating oxygen from air and/or with the compressor 117 for compressing hydrogen separated in the hydrogen separator 111. Optionally, any excess energy produced by expanding the hydrocarbon oxygenate product gas or the hydrocarbon product gas through the expander 119 may be delivered for use outside the system for practicing the process of the present invention.

The expanded hydrocarbon oxygenate product gas or the expanded hydrocarbon product gas may then be condensed in condenser 123 at a temperature selected to be effective to separate a liquid hydrocarbon oxygenate product, preferably methanol, or a liquid hydrocarbon product from carbon dioxide and other gases in the hydrocarbon oxygenate product gas or the hydrocarbon product gas that are not condensable at the selected temperature. The expanded hydrocarbon oxygenate product gas or the expanded hydrocarbon product gas may be provided to the condenser 123 from the expander via line 125.

The temperature selected to condense a liquid hydrocarbon oxygenate from an expanded hydrocarbon oxygenate product gas should be in the range from above the sublimation point of carbon dioxide (−78° C.) to below the boiling point of the liquid hydrocarbon oxygenate, or, if more than one liquid hydrocarbon oxygenate is present in the expanded hydrocarbon oxygenate product gas, below the boiling point of the azeotropic hydrocarbon oxygenate mixture. For example, if the hydrocarbon oxygenate to be condensed is methanol, the temperature for operating the condenser 123 should be selected within the range of above −78° C. to below 67° C., and preferably from 10° C. to 35° C.

Likewise, the temperature selected to condense a liquid hydrocarbon from an expanded hydrocarbon product gas should be in the range from above the sublimation point of carbon dioxide (−78° C.) to below the boiling point of the liquid hydrocarbon, or, if more than one liquifiable hydrocarbon is present in the expanded hydrocarbon product gas (which is likely with a Fisher-Tropsch reaction product), below the boiling point of the hydrocarbon mixture. In an embodiment, the temperature for operating the condenser 123 to condense a liquid hydrocarbon product from the expanded hydrocarbon product gas may be selected within the range of from 0° C. to 50° C., and preferably from 10° C. to 35° C.

The temperature at which the liquid hydrocarbon or the liquid hydrocarbon oxygenate may be condensed in the condenser 123 may be regulated with a coolant. The coolant may circulate through the condenser 123, for example through coolant coils or through a coolant jacket in the condenser, to exchange heat with the hydrocarbon oxygenate product gas or the hydrocarbon product gas and thereby condense the liquid hydrocarbon oxygenate product or the liquid hydrocarbon product from the gas. In a preferred embodiment, the coolant is water, and the water may be chilled water having a temperature of less than 25° C., or less than 20° C.

The liquid hydrocarbon or liquid hydrocarbon oxygenate, preferably methanol, which may optionally contain some water may be separated as a product of the process from the condenser 123 through line 127. The liquid hydrocarbon product or liquid methanol product may be utilized as described in more detail below. The process of the present invention is highly efficient, where at least 80%, or at least 85%, or at least 90%, on a molar basis, of carbon present in the hydrocarbons of the extracted gas may be recovered in the liquid hydrocarbon or the liquid hydrocarbon oxygenate, which is preferably methanol.

A carbon dioxide-rich gas may be separated from the condenser 123 through line 129. In an embodiment, the carbon dioxide-rich gas may be re-injected into the reservoir 1 through the well 3. Re-injection of the carbon dioxide rich gas into the reservoir 1 serves to reduce the amount of greenhouse gases emitted into the atmosphere as a result of conducting the process of the invention and also serves to maintain the reservoir pressure. In an embodiment, at least 85%, or at least 90%, or at least 95% of the carbon dioxide present in the extracted gas, on a mass basis, is recovered by separation from the condenser and is re-injected into the reservoir 1. Further, as described above, injection of carbon dioxide into the reservoir may serve to fracture the formation of the reservoir 1 to enable the production of further natural gas from the reservoir 1, particularly if the carbon dioxide is re-compressed prior to injecting it into the reservoir 1. In an embodiment, liquid nitrogen derived from separating the oxygen containing gas from air in the air separation unit 8 may be used to cool the carbon dioxide-rich gas, and the cooled carbon dioxide-rich gas may be compressed prior to injection to increase the efficiency of injection. In an embodiment, the liquid hydrocarbon oxygenate product or the liquid hydrocarbon product may be transported and/or further processed. The liquid hydrocarbon product or liquid hydrocarbon oxygenate product may be loaded into transport containers, for example liquid transport tanks, and then may be transported to a selected location. For example, liquid hydrocarbon product or liquid hydrocarbon oxygenate product produced from a reservoir located offshore may be loaded into liquid transport tanks on a ship and then transported by the ship to a refinery for further processing.

Liquid hydrocarbon oxygenate product that is methanol, or primarily methanol, may be further processed to produce higher molecular weight hydrocarbon products either after being transported or at the well-site. In an embodiment of the process of the invention, the methanol recovered as liquid methanol product may be converted to a high octane gasoline product by the known methanol-to-gasoline process in which methanol may be converted to gasoline utilizing one or more catalysts such as solid acid catalysts including zeolite or silicaaluminophosphate molecular sieve catalysts. The liquid methanol product may be superheated and mixed with a synthesis gas, optionally the oxidation product gas, and contacted with a zeolite catalyst, in an embodiment a ZSM-5 zeolite, in a methanol conversion reactor (not shown) at a temperature of from 360° C. to 380° C. and a pressure of from 1.5 MPa to 2.5 MPa to produce a gasoline-containing product. Gasoline may be separated from the gasoline-containing product by distillation.

In another embodiment of the process of the invention, liquid methanol product may be converted to light olefins including ethene and propene according to known methanol-to-olefin processes. The liquid methanol product may be heated to a temperature of from 450° C. to 550° C. at a pressure of less than 1.5 MPa and contacted with a solid acid catalyst, such as a zeolite or a silicaaluminophosphate molecular sieve catalyst to produce the olefin product.

In another embodiment of the invention, a liquid hydrocarbon product produced in the process by a Fisher-Tropsch type reaction may be converted to useful hydrocarbon transportation fuels such as a high cetane diesel or naphtha either after being transported or at the well site. The liquid hydrocarbon product may be converted to naphtha, diesel, and other hydrocarbon fractions by distilling the liquid hydrocarbon product and selecting appropriate boiling range cuts to separate selected hydrocarbon fractions such as diesel, or naphtha from other hydrocarbons present in the liquid hydrocarbon fraction.

What is claimed is:

1. A method for recovering a natural gas contaminated with high levels of $CO_2$ and converting the natural gas into a liquid hydrocarbon containing one or more hydrocarbons or a liquid hydrocarbon oxygenate containing one or more liquid hydrocarbon oxygenates, comprising:

a) extracting a gas comprising carbon dioxide and methane from a reservoir containing natural gas, where carbon dioxide comprises at least 50 vol. % of the extracted gas; and b) oxidizing the extracted gas with an oxygen containing gas in the presence of a partial oxidation catalyst at a temperature of less than 600° C. to produce an oxidation product gas containing hydrogen, carbon monoxide, and carbon dioxide, where the molar ratio of oxygen from the oxygen containing gas to carbon from the hydrocarbons of the extracted gas is less than one;

c) utilizing the oxidation product gas to produce the liquid hydrocarbon containing one or more hydrocarbons or the liquid hydrocarbon oxygenate containing one or more hydrocarbon oxygenates.

2. The method of claim 1 wherein the extracted gas is oxidized with the oxygen containing gas in the presence of the partial oxidation catalyst at a temperature of from 250° C. to 550° C.

3. The method of claim 1 wherein the oxygen containing gas contains at least 90 vol. % oxygen.

4. The method of claim 1 wherein the extracted gas is oxidized with the oxygen containing gas in the presence of steam.

5. The method of claim 4 further comprising mixing steam with the extracted gas and the oxygen containing gas to autothermally reform methane present in the extracted gas, wherein the amount of steam mixed with the extracted gas and the oxygen containing gas is selected to provide a molar ratio of steam to carbon from hydrocarbons in the extracted gas of greater than 0 and less than 0.4.

6. The method of claim 1 wherein carbon dioxide comprises more than 60 vol. % of the extracted gas.

7. The method of claim 1 wherein the catalyst comprises rhodium and iridium.

8. The method of claim 1 further comprising the step of exchanging heat between the oxidation product gas and one or more gases selected from the group consisting of the extracted gas, the oxygen-containing gas, steam, and mixtures thereof to cool the oxidation product gas by at least 100° C. and to heat the one or more gases selected from the group consisting of the extracted gas, the oxygen-containing gas, steam, and mixtures thereof to a temperature of at least 400° C.

9. The method of claim 1 further comprising the step of separating carbon dioxide from the liquid hydrocarbon or the liquid hydrocarbon oxygenate to produce the liquid hydrocarbon containing one or more hydrocarbons or the liquid hydrocarbon oxygenate containing one or more hydrocarbon oxygenates.

10. The method of claim 9 further comprising the step of re-injecting the carbon dioxide separated from the liquid hydrocarbon or the liquid hydrocarbon oxygenate into the reservoir.

11. The method of claim 10 wherein at least 85% of the carbon dioxide present in the extracted gas, on a mass basis, is recovered by separation from the liquid hydrocarbon or the liquid hydrocarbon oxygenate and is re-injected into the reservoir.

12. The method of claim 1 wherein the oxidation product gas is utilized to produce a liquid hydrocarbon oxygenate by:
a) optionally contacting the oxidation product gas with steam and a water gas shift catalyst at a temperature of from 200° C. to 400° C. and a pressure of from 0.1 MPa to 15 MPa to produce a water-gas shifted oxidation product gas;
b) contacting the oxidation product gas or the water-gas shifted oxidation product gas with a hydrocarbon oxygenate synthesis catalyst at a temperature of from 200° C. to 300° C. and a pressure of from 5 MPa to 15 MPa to produce a hydrocarbon oxygenate product gas containing a hydrocarbon oxygenate;
c) optionally separating one or more non-hydrocarbon oxygenate gases from the hydrocarbon oxygenate product gas to produce a hydrocarbon oxygenate-enriched hydrocarbon oxygenate product gas; and
d) separating liquid hydrocarbon oxygenate from the hydrocarbon oxygenate product gas or the hydrocarbon oxygenate-enriched hydrocarbon oxygenate product gas.

13. The method of claim 12 further comprising recovering at least 80%, on a molar basis, of carbon initially present in the hydrocarbons of the extracted gas in the liquid hydrocarbon oxygenate.

14. The method of claim 1 wherein the oxidation product gas is utilized to produce liquid methanol by:
a) optionally contacting the oxidation product gas with steam and a water gas shift catalyst at a temperature of from 200° C. to 400° C. and a pressure of from 0.1 MPa to 15 MPa to produce a water-gas shifted oxidation product gas;
b) contacting the oxidation product gas or the water-gas shifted oxidation product gas with a methanol synthesis catalyst at a temperature of from 200° C. to 300° C. and a pressure of from 5 MPa to 15 MPa to produce a methanol product gas containing methanol;
c) optionally separating one or more non-methanol gases from the methanol product gas to produce a methanol-enriched hydrocarbon oxygenate product gas; and
d) separating liquid methanol from the methanol product gas or the methanol-enriched methanol product gas.

15. The method of claim 14 wherein the step of optionally separating one or more non-methanol gases from the methanol product gas to produce a methanol-enriched product gas comprises separating hydrogen from the methanol product gas.

16. The method of claim 15 further comprising the steps of
a) compressing the separated hydrogen to a pressure of from 5 MPa to 15 MPa; and
b) mixing the compressed separated hydrogen with the oxidation product gas or the water-gas shifted combustion product gas prior to contacting the oxidation product gas or the water-gas shifted oxidation product gas with the methanol synthesis catalyst to produce the methanol product gas.

17. The method of claim 14 further comprising the step of expanding the methanol product gas through an expander to produce energy.

18. The method of claim 17 further comprising the step of utilizing at least a portion of the energy produced by expanding the methanol product gas through the expander to separate oxygen from air and, optionally, to compress the separated oxygen to a pressure of from 5 MPa to 15 MPa.

19. The method of claim 18 wherein the step of utilizing at least a portion of the energy produced by expanding the methanol product gas through the expander to separate oxygen from air further separates liquid nitrogen from air.

20. The method of claim 19 further comprising the step of cooling the oxidation product gas with the separated liquid nitrogen.

21. The method of claim 14 wherein the step of separating liquid methanol from the methanol product gas comprises separating liquid methanol from carbon dioxide.

22. The method of claim 14 wherein the liquid methanol separated from the methanol product gas further comprises water.

23. The method of claim 14 further comprising the step of cooling the oxidation product gas by at most 300° C. prior to contacting the oxidation product gas with steam and the water-gas shift catalyst.

24. The method of claim 14 further comprising the step of cooling the oxidation product gas by at most 300° C. prior to contacting the oxidation product gas with the methanol synthesis catalyst.

25. The method of claim 14 further comprising the step of converting the liquid methanol product to gasoline.

26. The method of claim 14 further comprising the step of converting the liquid methanol product to one or more olefins.

27. The method of claim 14 further comprising recovering at least 80%, on a molar basis, of carbon initially present in the hydrocarbons of the extracted gas in the liquid methanol.

28. The method of claim 1 wherein the oxidation product gas is utilized to produce a liquid hydrocarbon by:
   a) optionally contacting the oxidation product gas with steam and a water-gas shift catalyst at a temperature of from 200° C. to 400° C. and a pressure of from 0.1 MPa to 15 MPa to produce a water-gas shifted oxidation product gas;
   b) contacting the oxidation product gas or the water-gas shifted oxidation product gas with a Fisher-Tropsch catalyst at a temperature of from 200° C. to 400° C. and a pressure of from 1 MPa to 5 MPa to produce a hydrocarbon product gas;
   c) optionally separating one or more non-hydrocarbon gases from the hydrocarbon product gas to produce a hydrocarbon-enriched hydrocarbon product gas; and
   d) separating a liquid hydrocarbon product from the hydrocarbon product gas or the hydrocarbon-enriched hydrocarbon product gas.

29. The method of claim 28 further comprising the step of cooling the oxidation product gas by at most 300° C. prior to contacting the oxidation product gas with steam and the water-gas shift catalyst.

30. The method of claim 28 further comprising the step of cooling the oxidation product gas by at most 300° C. prior to contacting the oxidation product gas with the Fisher-Tropsch catalyst.

31. The method of claim 28 further comprising the step of separating a hydrocarbon fraction from the liquid hydrocarbon product.

32. The method of claim 31 wherein the hydrocarbon fraction separated from the liquid hydrocarbon product is selected from the group consisting of naphtha and diesel.

33. The method of claim 28 further comprising recovering at least 80%, on a molar basis, of carbon initially present in the hydrocarbons of the extracted gas in the liquid hydrocarbon product.

* * * * *